(12) United States Patent
Boyce et al.

(10) Patent No.: US 8,238,613 B2
(45) Date of Patent: Aug. 7, 2012

(54) TECHNIQUE FOR BIT-ACCURATE FILM GRAIN SIMULATION

(75) Inventors: Jill MacDonald Boyce, Manalapan, NJ (US); Cristina Gomila, Princeton, NJ (US); Joan Llach, Princeton, NJ (US); Alexandros Michael Tourapis, West Windsor, NJ (US); Jeffrey Allen Cooper, Rocky Hill, NJ (US); Peng Yin, West Windsor, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 600 days.

(21) Appl. No.: 10/575,676

(22) PCT Filed: Oct. 12, 2004

(86) PCT No.: PCT/US2004/033713
§ 371 (c)(1),
(2), (4) Date: Oct. 25, 2006

(87) PCT Pub. No.: WO2005/039189
PCT Pub. Date: Apr. 28, 2005

(65) Prior Publication Data
US 2007/0070241 A1    Mar. 29, 2007

Related U.S. Application Data

(60) Provisional application No. 60/511,026, filed on Oct. 14, 2003.

(51) Int. Cl.
*G06K 9/00* (2006.01)
(52) U.S. Cl. .......................................... 382/112; 348/96
(58) Field of Classification Search .................. 382/100, 382/112, 254, 232, 255, 166, 282, 272; 348/96, 348/44; 358/460
See application file for complete search history.

(56) References Cited

U.S. PATENT DOCUMENTS

| 4,663,663 | A | * | 5/1987 | Lee |
| 4,897,775 | A | | 1/1990 | Kaassens |
| 4,930,023 | A | * | 5/1990 | Yakame |
| 4,935,816 | A | | 6/1990 | Faber |
| 5,028,280 | A | | 7/1991 | Ihara et al. |
| 5,140,414 | A | | 8/1992 | Mowry |
| 5,262,248 | A | | 11/1993 | Ihara et al. |
| 5,335,013 | A | | 8/1994 | Faber |

(Continued)

FOREIGN PATENT DOCUMENTS
EP     0364285     4/1990
(Continued)

OTHER PUBLICATIONS

Christina Gomila: "SEI message for film grain encoding: syntax and results" JVT of ISO IEC MPEG ITU-T VCEG JVT-1013 Revision 2, Sep. 2, 2003, pp. 1-11, XP002308743 San Diego, CA, USA p. 1, Line 1—p. 5, Last Paragraph.

(Continued)

*Primary Examiner* — Anand Bhatnagar
(74) *Attorney, Agent, or Firm* — Robert D. Shedd; Robert B. Levy

(57) ABSTRACT

The simulation of film grain in an image makes use of parameters contained in a Supplemental Enhancement Information (SEI) message that accompanies the image upon transmission. The SEI message specifies film grain simulation parameters such as the film simulation model, the blending mode, and color space.

6 Claims, 1 Drawing Sheet

U.S. PATENT DOCUMENTS

| | | | |
|---|---|---|---|
| 5,374,954 A | 12/1994 | Mowry | |
| 5,406,326 A | 4/1995 | Mowry | |
| 5,457,491 A | 10/1995 | Mowry | |
| 5,471,572 A | 11/1995 | Buchner et al. | |
| 5,475,425 A | 12/1995 | Przyborski et al. | |
| 5,550,815 A | 8/1996 | Cloonan et al. | |
| 5,629,769 A | 5/1997 | Cookingham et al. | |
| 5,641,596 A * | 6/1997 | Gray et al. | |
| 5,659,382 A | 8/1997 | Rybczynski | |
| 5,687,011 A | 11/1997 | Mowry | |
| 5,706,361 A | 1/1998 | Kent et al. | |
| 5,709,972 A | 1/1998 | Cookingham et al. | |
| 5,767,860 A | 6/1998 | Zimmer et al. | |
| 5,805,782 A | 9/1998 | Foran | |
| 5,817,447 A | 10/1998 | Yip | |
| 5,831,673 A | 11/1998 | Przyborski et al. | |
| 5,832,172 A | 11/1998 | Jeon | |
| 5,917,609 A | 6/1999 | Breeuwer et al. | |
| 6,219,838 B1 | 4/2001 | Cherichetti et al. | |
| 6,233,647 B1 | 5/2001 | Bentz et al. | |
| 6,269,180 B1 | 7/2001 | Sevigny | |
| 6,327,391 B1 | 12/2001 | Ohnishi et al. | |
| 6,373,992 B1 | 4/2002 | Nagao | |
| 6,459,699 B1 | 10/2002 | Kimura et al. | |
| 6,496,221 B1 | 12/2002 | Wolf et al. | |
| 6,559,849 B1 | 5/2003 | Anderson et al. | |
| 6,587,509 B1 | 7/2003 | Suzuki et al. | |
| 6,650,327 B1 | 11/2003 | Airey et al. | |
| 6,868,190 B1 * | 3/2005 | Morton | 382/278 |
| 6,990,251 B2 * | 1/2006 | Edgar | 382/275 |
| 6,995,793 B1 | 2/2006 | Albadawi et al. | |
| 7,065,255 B2 | 6/2006 | Chen et al. | |
| 7,171,057 B1 * | 1/2007 | Wilensky et al. | |
| 7,738,722 B2 | 6/2010 | Gomila et al. | |
| 7,742,655 B2 | 6/2010 | Gomila et al. | |
| 7,945,106 B2 * | 5/2011 | Gomila et al. | |
| 7,958,532 B2 | 6/2011 | Paul et al. | |
| 2001/0056568 A1 | 12/2001 | Hirotsu et al. | |
| 2002/0034337 A1 | 3/2002 | Shekter | |
| 2002/0154140 A1 | 10/2002 | Tazaki | |
| 2002/0171649 A1 | 11/2002 | Fogg | |
| 2003/0011615 A1 | 1/2003 | Tidwell | |
| 2003/0043922 A1 | 3/2003 | Kalker et al. | |
| 2003/0206231 A1 | 11/2003 | Chen et al. | |
| 2003/0206662 A1 | 11/2003 | Avinash et al. | |
| 2003/0218610 A1 | 11/2003 | Mech et al. | |
| 2004/0013308 A1 | 1/2004 | Jeon et al. | |
| 2006/0072660 A1 | 4/2006 | Jia et al. | |
| 2006/0082649 A1 | 4/2006 | Gomila et al. | |
| 2006/0083316 A1 | 4/2006 | Cooper et al. | |
| 2006/0083426 A1 | 4/2006 | Cooper et al. | |
| 2006/0133686 A1 * | 6/2006 | Gomila et al. | |
| 2006/0182183 A1 | 8/2006 | Winger | |
| 2006/0256871 A1 * | 11/2006 | Boyce et al. | 375/240.27 |
| 2006/0291557 A1 | 12/2006 | Tourapis | |
| 2007/0002947 A1 | 1/2007 | Lu et al. | |
| 2007/0036452 A1 | 2/2007 | Llach et al. | |
| 2007/0047658 A1 | 3/2007 | Tourapis et al. | |
| 2007/0058866 A1 | 3/2007 | Boyce et al. | |
| 2007/0058878 A1 * | 3/2007 | Gomilla et al. | |
| 2007/0070241 A1 | 3/2007 | Boyce et al. | |
| 2007/0104380 A1 | 5/2007 | Gomila et al. | |
| 2007/0117291 A1 * | 5/2007 | Cooper et al. | |
| 2008/0252781 A1 | 10/2008 | De Waele et al. | |

FOREIGN PATENT DOCUMENTS

| | | |
|---|---|---|
| EP | 0373615 | 6/1990 |
| EP | 0879006 | 12/1990 |
| EP | 0622000 | 10/1992 |
| EP | 0766281 | 1/1997 |
| EP | 0575006 | 10/1999 |
| EP | 1175091 | 1/2002 |
| EP | 1215624 | 6/2002 |
| EP | 1511320 | 3/2005 |
| GB | 2312124 A | 10/1997 |
| JP | 4-097681 | 3/1992 |
| JP | 9-073765 | 3/1996 |
| JP | 8-149466 | 6/1996 |
| JP | 9-082718 | 3/1997 |
| JP | 2001/357090 | 12/2001 |
| JP | 2002/359846 | 12/2005 |
| JP | 2007/829945 | 10/2007 |
| WO | WO9314591 | 7/1993 |
| WO | WO9520292 | 7/1995 |
| WO | WO 97/10575 | 3/1997 |
| WO | WO 97/22204 A | 6/1997 |
| WO | WO 00/18109 | 3/2000 |
| WO | WO-0146992 | 6/2001 |
| WO | WO-0177871 | 10/2001 |
| WO | WO 02/33958 | 4/2002 |
| WO | WO 2004/095829 | 11/2004 |
| WO | WO-2004104931 | 12/2004 |
| WO | WO2004105250 | 12/2004 |
| WO | WO 2004/034518 | 4/2005 |
| WO | WO 2008/039189 | 4/2005 |
| WO | WO 2006/057703 | 6/2005 |
| WO | WO 2005/027046 | 3/2006 |

OTHER PUBLICATIONS

Christina Gomila, Alexander Kobilansky: SEI Message for Film Grain Encoding JVT of iso iec mpeg and itu-t vceg JVT-H022. May 23, 2003, pp. 1-14, XP002308742 Geneva Switzerland abstract p. 2. paragraph 1—p. 6, last line: figures 1,2 p. 9, paragraph 2.

M. Schlockermann, S. Wittman, T. Wedi, S. Kadono: "Film grain coding in H. 264/AVC" JVT-1034d2, Sep. 2, 2003, pp. 1-8, XP002311238 San Diego, CA. USA p. 1, Line 1—p. 2, Last Line.

Al-Shaykh et al, "Lossy Compression of Images Corrupted by Film Grain Noise," School of Electrical and Computer Engineering, 1996 IEEE.

Al-Shaykh et al, "Restoration of Lossy Compressed Noisy Images," IEEE Transactions on Image Processing, vol. 8, No. 10, Oct. 1999.

Al-Shaykh, "Lossy Compression of Noisy Images," IEEE Transactions on Image Processing, vol. 7, No. 12, Dec. 1998.

Brightwell et al, "Automated Correction of Film Unsteadiness, Dirt and Grain," International Broadcasting Convention, Sep. 16-20, 1994, Conference Publication No. 397, IEE, 1994.

Campisi et al, "Signal-Dependent Film Grain Noise Generation Using Homomorphic Adaptive Filtering," IEE Proceedings, Image Signal Process, vol. 147, No. 3, Jun. 2000.

Zhao et al, "Constant Quality Rate Control for Streaming MPEG-4 Fgs. Video," Integrated Media Systems Center and Department of Electrical Engineering, University of Southern California, 2000 IEEE.

Chavel et al, "Film Grain Noise in Partially Coherent Imaging," Optical Engineering, vol. 19, No. 3, May-Jun. 1980.

Fischer et al, "Image Sharpening Using Permutation Weighted Medians," Department of Electrical Engineering, University of Delaware, fischer@ee.udel.edu, paredesj@ee.udel.edu, arce@ee.udel.edu, Apr. 9, 2000.

Illingworth et al, "Vision, Image and Signal Processing," The Institution of Electrical Engineers, IEE Proceedings, Jun. 2000, vol. 147, No. 3.

McLean et al, "Telecine Noise Reduction," XP-002285972, 2001 The Institute of Electrical Engineers.

Oktem et al, "Transform Domain Algorithm for Reducing Effect of Film-Grain Noise in Image Compression," Electronics Letters, Oct. 14, 1999, vol. 35, No. 21.

Peng et al, "Adaptive Frequency Weighting for Fine-Granularity-Scalability," Visual Communications and Image Processing 2002, Proceedings of SPIE, vol. 4671, 2002 SPIE 0277-786X/02.

Prades-Nebot et al, "Rate Control for Fully Fine-Grained Scalable Video Coders," Visual Communications and Image Processing 2002, Proceedings of SPIE, vol. 4671 (2002), SPIE 0277-786X/02.

Schaar et al, "Fine-Granularity-Scalability for Wireless Video and Scalable Storage," Visual Communications and Image Processing 2002, Proceedings of SPIE, vol. 4671 (2002) SPIE 0277-786X/02.

Shahnaz et al, "Image Compression in Signal-Dependent Noise," Applied Optics, vol. 38, No. 26, Sep. 10, 1999.

Visual Communication and Image Processing 2002, Proceedings of the SPIE, The International Society for Optical Engineering, vol. 4672, pt. 1-2, 2002.

Yan et al, "Efficient Video Coding with Hybrid Spatial and Fine-Grain SNR Scalabilities," Department of Electronic Engineering, Beijing Institute of Technology, China, Jan. 2002.

Yan et al, "Film Grain Noise Removal and Generation for Color Images," Department Electrical and Computer Engineers, University of Toronto, dimitris@comm.toronto.edu, May 15, 1998.

Yan et al, "Signal-Dependent Film Grain Noise Removal and Generation Based on Higher-Order Statistics," University of Toronto, Department of Electrical and Computer Engineering, dimitris@comm.toronto.edu, 1997 IEEE.

Yoshida, "Go with the Grain, Film R&D Chief Urges, for Art's Sake," EE Times, Feb. 7, 2005.

Zhang et al, "Constant Quality Constrained Rate Allocation for FGS Video Coded Bitstreams," Visual Communications and Image Processing 2002, Proceedings of SPIE, vol. 4671 (2002) SPIE 0277-786X/02.

Office Action from U.S. Appl. No. 10/556,834 mailed Aug. 19, 2008.
Office Action from U.S. Appl. No. 10/556,834 mailed Feb. 20, 2009.
Notice of Non-Compliant Amendment from U.S. Appl. No. 10/556,834 mailed Jun. 16, 2009.
Office Action from U.S. Appl. No. 10/569,318 mailed Aug. 15, 2008.
Office Action from U.S. Appl. No. 10/569,318 mailed Feb. 13, 2009.
Office Action from U.S. Appl. No. 10/569,318 mailed Jul. 31, 2009.
Office Action from U.S. Appl. No. 10/572,820 mailed Jun. 1, 2009.
Office Action from U.S. Appl. No. 10/571,148 mailed Apr. 15, 2009.
Office Action from U.S. Appl. No. 11/246,848 mailed Jun. 26, 2009.
Office Action from U.S. Appl. No. 11/252,177 mailed May 29, 2008.
Office Action from U.S. Appl. No. 11/252,177 mailed Nov. 5, 2008.
Office Action from U.S. Appl. No. 11/252,177 mailed Apr. 17, 2009.
Office Action from U.S. Appl. No. 11/252,177 mailed Sep. 18, 2009.

Yan et al., "Efficient Video Coding with Hybrid Spatial and Fine-Grain SNR Scalabilities", Visual Communications and Image Processing 2002, Proceedings of SPIE, vol. 4671, 2002.

Yan et al., "Signal-Dependent Film Grain Noise Removal and Generation Base on Higher-Order Statistics", Ontario, Canada, 1997.

Van Der Schaar, "Fine-Granualarity-Scalabity for Wireless Video and Scalable Storage", Visual Communications and Image Processing 2002, Proceedings of SPIE, vol. 4671, 2002.

Prades-Nebot. "Rate control for Fully Fine-Grained Scalable Video Coders", Visual Communications and Image Processing 2002, Proceedings of SPIE, vol. 4571, 2002.

Illingworth et al., "Vision, Image and Signal Processing",IEE Proceedings, vol. 147, No. 3, United Kingdom, Jun. 2000.

Al-Shaykh et al., "Lossy Compression of Images Corrupted by Film Grain Noise", IEEE, Atlanta, GA, 1996.

Mclean et al., "Telecine Noise Reduction", The Institution of Electrical Engineers, London, UK, Jan. 16, 2001, pp. 1-6.

Peng et al., "Adaptive Frequency Weighting for Fine-Granualatity-Scalability", Visual Communications and Image Processing 2002, Proceedings of SPIE, vol, 4671, 2002.

Oktem et al., "Transform Domain Algorithm for Reducing Effect of Film-Grain Noise in Image Compression", Electronics Letters, vol. 35, No. 21, Oct. 14, 1999.

Al-Shaykh et al., "Restoration of Lossy Compressed Noisy Images", IEEE Transactions on Image Processing, vol. 8, No. 10, Oct. 1999.

Shahnaz et al., "Image Compression in Signal-Dependent Noise", Applied Optics, vol. 38, No. 26, Sep. 10, 1999.

Zhao et al., Constant Quality Rate Control for Streaming MPEG-4 FGS Video, IEEE, 2002.

Al-Shaykh, et al., "Lossy Compression of Noisy Images", IEEE Transactions on Image Processing, vol. 7, No. 12, Dec. 1998.

Brightwell et al., "Automated Correction of Film Unsteadiness, Dirt and Grain", International Broadcasting Convention, Sep. 16-20, 1994.

Fischer et al., "Image Sharpening Using Permulation Weighted Medians", National Science Foundation.

Campisi et al., "Signal-Dependent Film Grain Noise Generation using Homomorphic Adaptive Filtering", IEEE Proc.-Vis. Image Signal Processing, vol. 147, No. 3, Jun. 2000.

Chavel et al., "Film Grain Noise in Partially Coherent Imaging", Optical Engineering, vol. 19, No. 3, May/Jun. 1980.

Office Action from U.S. Appl. No. 10/552,179, mailed Sep. 1, 2010.
Office Action from U.S. Appl. No. 10/556,833, mailed May 10, 2010.
Final Office Action from U.S. Appl. No.10/556,833, mailed Oct. 20, 2010.
Office Action from U.S. Appl. No. 10/556,833, mailed Jan. 7, 2011.
Office Action from U.S. Appl. No. 10/556,833, mailed Feb. 15, 2011.
Office Action from U.S. Appl. No. 10/556,833, mailed May 10, 2011.
Office Action from U.S. Appl. No. 10/556,833, mailed Sep. 30, 2011.
Final Office Action from U.S. Appl. No. 10/571,148, mailed May 12, 2010.
Office Action from U.S. Appl. No. 10/571,148, mailed Sep. 10, 2010.
Office Action from U.S. Appl. No. 10/572,820, mailed Mar. 19, 2010.
Office Action from U.S. Appl. No. 10/572,820, mailed May 11, 2010.
Final Office Action from U.S. Appl. No. 10/572,820, mailed Sep. 30, 2010.
Office Action from U.S. Appl. No. 11/246,848, mailed Jul. 5, 2010.
Final Office Action from U.S. Appl. No. 11/246,848, mailed Oct. 13, 2010.
Office Action from U.S. Appl. No. 11/266,070, mailed Jul. 23, 2010.
Final Office Action from U.S. Appl. No. 11/268,070, Nov. 12, 2010.
Office Action from U.S. Appl. No. 11/268,070, mailed Jan. 11, 2011.
Office Action from U.S. Appl. No. 11/268,070, mailed Jun. 22, 2011.
Final Office Action from U.S. Appl. No. 11/273,067, mailed Aug. 4, 2010.
Office Action from U.S. Appl. No. 11/284,378, mailed Aug. 31, 2010.
Office Action from U.S. Appl. No. 11/284,378, mailed Dec. 22, 2010.
Office Action from U.S. Appl. No. 11/667,581, mailed Jun. 8, 2011.
Final Office Action from U.S. Appl. No. 11/657,581, mailed Oct. 14, 2011.
Office Action from U.S. Appl. No. 11/887,629, mailed Jul. 9, 2010.
Final Office Action from U.S. Appl. No. 11/667,629, mailed Nov. 19, 2010.
Office Action from U.S. Appl. No. 11/667,629, mailed Jan. 13, 2011.
Final Office Action from U.S. Appl. No. 11/667,629, mailed Apr. 22, 2011.
Office Action from U.S. Appl. No. 11/667,818, mailed Sep. 15, 2011.
Final Office Action from U.S. Appl. No. 11/667,818, mailed Dec. 5, 2011.
Office Action from U.S. Appl. No. 11/557,846, mailed Oct. 4, 2011.
Office Action from U.S. Appl. No. 12/582,217, mailed Jul. 13, 2010.
Final Office Action from U.S. Appl. No. 12/589,217, mailed Oct. 28, 2010.
Office Action from U.S. Appl. No. 12/588,217, Dec. 2, 2010.

Gomila et al: "Film Grain Modeling vs. Encoding", May 23-27, 2003. JVT of ISO/IEC MPEG & ITU-T VCEG 11$^{th}$ Meeting, Munich, DE, Mar. 15-19, 2004.

Conklin et al: "Dithering 5-Tap Filter for Inloop Deblocking", JVT of ISO/IEC MPEG & ITU-T VCEG 3$^{rd}$ Meeting, Fairfax, Virginia, May 6-10, 2003, pp. 1-16.

Byun et al: "Power Efficient MPEG-4 Decoder Featuring Low-Complexity Error Resilience", ASIC, 2002 Proceedings, 2002 IEEE Asia-Pacific Conference on August 808, 2002, Piscataway, NJ USA, IEEE.

Takashi et al: "A 60-MWMPEG4 Video Codec Using Clustered Voltage Scaling with Variable Supple-Voltage Scheme", IEEE Jurnal of Solid-State Circuits, IEEE Service Center, Piscataway, NJ USA, vol. 33, No. 11.

Puri et al: "Video Coding Using the H264/MPEG-4 AVC Compression Standard", Signal Processing Image Communication, Elsevier Science Publishers, Amsterdam, NL, vol. 19, No. 9, Oct. 1, 2004, pp. 7993-549.

Pirsch et al: "VLSI Architecture for Video Compression—A Survey", Proceedings of the IEEE, IEEE, New York, USA, vol. 83, No. 2, Feb. 1, 1995, pp. 220-245.

\* cited by examiner

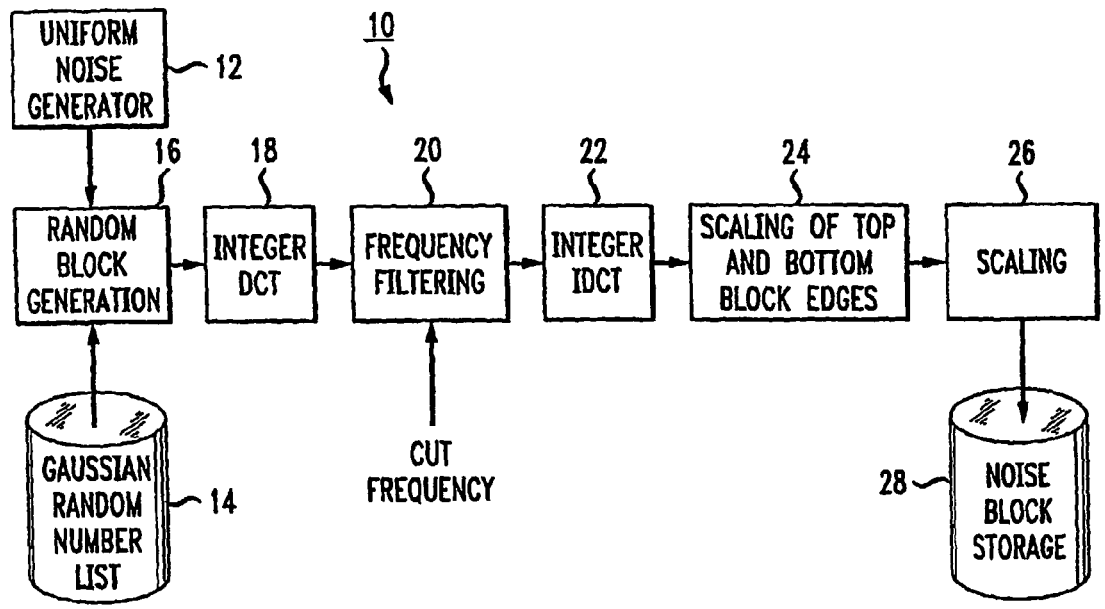
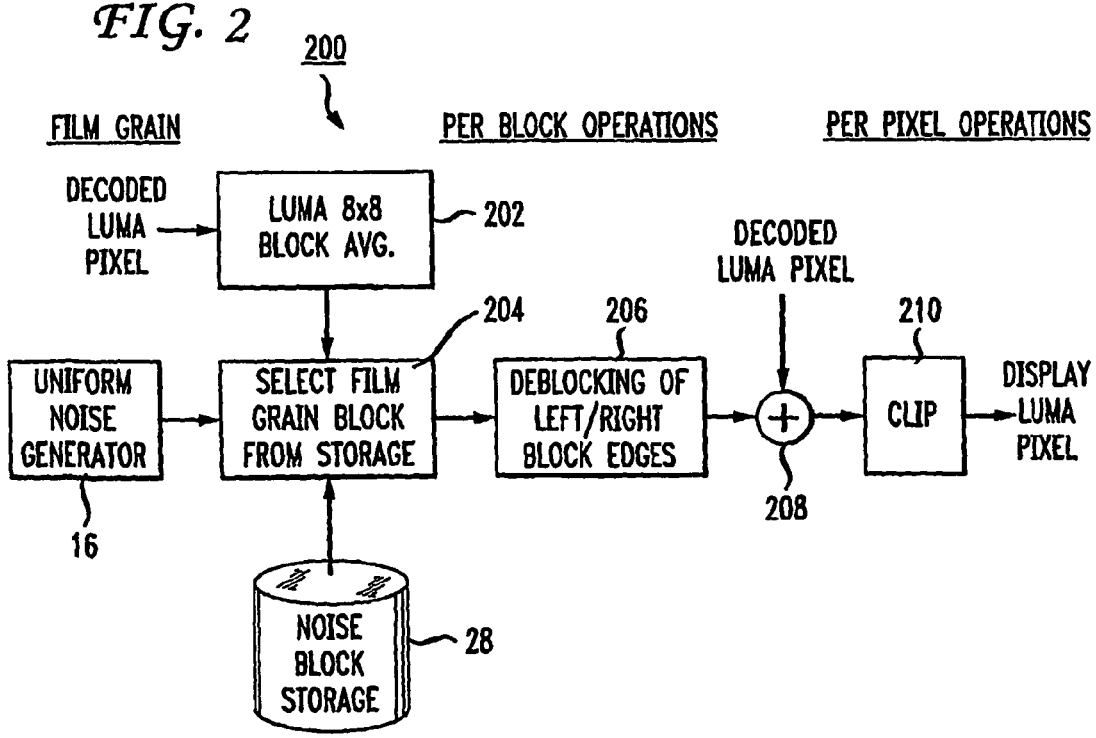

TECHNIQUE FOR BIT-ACCURATE FILM GRAIN SIMULATION

CROSS-REFERENCE TO RELATED APPLICATIONS

This application claims the benefit, under 35 U.S.C. §365 of International Application PCT/US2004/033713, filed Oct. 12, 2004, which was published in accordance with PCT Article 21(2) on Apr. 28, 2005 in English and which claims the benefit of U.S. provisional patent application No. 60/511,026, filed Oct. 14, 2003.

TECHNICAL FIELD

This invention relates to a technique for simulating film grain in an image.

BACKGROUND ART

Motion picture films comprise silver-halide crystals dispersed in an emulsion, which is coated in thin layers on a film base. The exposure and development of these crystals form the photographic image consisting of discrete tiny particles of silver. In color negatives, tiny blobs of dye occur on the sites where the silver crystals form following chemical removal of the silver during development of the film stock. These small specks of dye commonly bear the label 'grain' in color film. Grain appears randomly distributed on the resulting image because of the random formation of silver crystals on the original emulsion. Within a uniformly exposed area, some crystals develop after exposure while others do not.

Grain varies in size and shape. The faster the film, the larger the clumps of silver formed and blobs of dye generated, and the more they tend to group together in random patterns. The term "granularity" typically refers to the grain pattern. The naked eye cannot distinguish individual grains, which vary from 0.0002 mm to about 0.002 mm. Instead, the eye resolves groups of grains, referred to as blobs. A viewer identifies these groups of blobs as film grain. As the image resolution becomes larger, the perception of the film grain becomes higher. Film grain becomes clearly noticeable on cinema and High Definition (HD) images, whereas film grain progressively loses importance in Standard Definition (SD) and becomes imperceptible in smaller formats.

Motion picture film typically contains image-dependent noise resulting either from the physical process of exposure and development of the photographic film or from the subsequent editing of the images. Photographic film possesses a characteristic quasi-random pattern, or texture, resulting from physical granularity of the photographic emulsion. Alternatively, simulation of similar pattern can occur in computed-generated images in order to blend them with photographic film. In both cases, this image-dependent noise bears the designation of "film grain." Quite often, moderate grain texture presents a desirable feature in motion pictures. In some instances, the film grain provides visual cues that facilitate the correct perception of two-dimensional pictures. Film grade often varies within a single film to provide various clues as to time reference, point of view, etc. Many other technical and artistic demands exist for controlling grain texture in the motion picture industry. Therefore, preserving the grainy appearance of images throughout image processing and delivery chain has become a requirement in the motion picture industry.

Several commercially available products have the capability of simulating film grain, often for blending a computer-generated object into natural scene. Cineon® from Eastman Kodak Co, Rochester N.Y., one of the first digital film applications to implement grain simulation, produces very realistic results for many grain types. However, the Cineon® application does not yield good performance for many high speed films because of the noticeable diagonal stripes the application produces for high grain size settings. Further, the Cineon® application fails to simulate grain with adequate fidelity when images become subject to prior processing, for example, such as when the images are copied or digitally processed.

Another commercial product that simulates film grain is Grain Surgery™ from Visual Infinity Inc., which is used as a plug-in of Adobe® After Effects®. The Grain Surgery™ product appears to generate synthetic grain by filtering a set of random numbers. This approach suffers from disadvantage of a high computational complexity.

Thus, a need exists for an efficient film grain simulation technique, which reduces the need for memory bandwidth, and computational effort, thus permitting film grain simulation in cost-sensitive high volume devices, such as set top boxes.

BRIEF SUMMARY OF THE INVENTION

Briefly, in accordance with a preferred embodiment of the present principles, there is provided a method for simulating film grain in an image block of M×N pixels, where N and M are integers greater than zero. The method commences by first computing the average of the pixel values within the block of M×N pixels. A film grain block of M×N pixels is selected from among a pool of previously established blocks containing film grain as a function of the average value of the image block and a random number. Each pixel in the selected film grain block is blended with a corresponding pixel in the image block.

BRIEF DESCRIPTION OF THE DRAWINGS

FIG. 1 depicts a block schematic drawing of an apparatus for generating pre-established film grain blocks for use in subsequent film grain simulation; and FIG. 2 depicts a block schematic drawing of an apparatus in accordance with the present principles for simulating film grain on a pixel-by-pixel basis using the pre-established film grain blocks generated by the apparatus of FIG. 1.

DETAILED DESCRIPTION

Introduction

The method of the present principles simulates film grain in accordance with film grain information transmitted with an image to which simulated grain is blended. In practice, the transmitted image typically undergoes compression (encoding) prior to transmission via one of a variety of well-known compression schemes, such as the H.264 compression scheme. With the transmitted image compressed using the H.264 compression scheme, transmission of the film grain information typically occurs via a Supplemental Enhancement Information (SEI) message. Pursuant to contributions recently adopted by the standards body responsible for promulgating the H.264 standard, the SEI message can now include various parameters that specify different film grain attributes.

Constraints on the film grain SEI message parameters

The method of the present principles imposes some constraints with regard to the number of parameters and their range of possible values allowed by the H.264 recommendation. TABLE 1 provides a list of such parameters, including a description of their semantics and the constraints imposed by the present principles.

TABLE I

| FILM GRAIN PARAMETER | DESCRIPTION & CONSTRAINTS |
| --- | --- |
| model_id | This parameter specifies the simulation model. It shall be 0, which identifies the film grain simulation model as frequency filtering. |
| separate_colour_description_present_flag | This parameter specifies if the color space in which the parameters are estimated is different from the color space in which the video sequence (where the film grain SEI message has been embedded) has been encoded. It shall be 0, which identifies the color space for film grain the same than the encoded sequence. |
| blending_mode_id | This parameter identifies the blending mode used to blend the simulated film grain with the decoded images. It shall be 0, which correspond to an additive blending mode. |
| log2_scale_factor | This parameter identifies the logarithmic scale factor used to represent the film grain parameters in the SEI message. It shall be in the range [0, 4] to ensure film grain simulation can be performed using 16-bit arithmetic. |
| comp_model_present_flag[1] | This parameter enables the transmission of film grain parameters for the Cb color component in the YCbCr color space. It shall be 0, since film grain simulation in chroma is not supported. |
| comp_model_present_flag[2] | This parameter enables the transmission of film gram parameters for the Cr color component hi the YCbCr color space. It shall be 0, since film gram simulation in chroma is not supported. |
| no_intensity_intervals_minus1[0] | This parameter defines the number of intensity intervals for which a specific set of parameters has been estimated. It shall be in the range [0, 7]. |
| intensity_interval_lower_bound[0][i + 1], intensity_interval_upper_bound[0][i] | These parameters define the boundaries of the luma intensity intervals for which different film grain parameters are defined. The lower bound of interval i + 1 must be greater than the upper bound of interval i because multigenerational film grain is not allowed. |
| num_model_values_minus1[0] | This parameter specifies the number of model values present for each intensity interval in which the film grain has been modeled. It shall be in the range [0, 4] because color correlation is not allowed. |
| comp_model_value[0][i][0] | This parameter represents the film grain intensity for each luminance intensity interval in which film grain has been modeled. It shall be in the range [0, 255] to ensure film grain simulation can be performed using 16-bit arithmetic. |

In addition to the previous constraints, the present principles imposes that film grain SEI messages precede I pictures, and only one film grain SEI message can precede a particular I picture. (The presence in the bit stream of slice_type equal to 7 or nal_ref_idc equal to 5, indicates an I picture.)

All the other parameters of the film grain SEI message have no constraint with respect to the standard specification.

Bit-Accurate Implementation of Film Grain Simulation

Film grain simulation in accordance with the present principles occurs in a two-step process. First, generation of a pool of film grain blocks occurs during initialization, as described in greater detail with respect to FIG. 1. Thereafter, selected film grain portions are added to each luminance pixel of each decoded picture as described with respect to FIG. 2.

FIG. 1 depicts an apparatus 10 in accordance with an illustrated embodiment of the present principles for generating a pool of film grain blocks for use in film grain simulation. The apparatus 10 typically generates a pool of 128 film grain blocks for each of as many as 8 different luminance intensity intervals. The SEI message field num_intensity_intervals_minus1 [0] indicates one less than the number of the luminance intensity intervals.

The apparatus 10 accomplishes film grain noise initialization using a specified uniform pseudo-random number polynomial generator 12 and using a specified list of 2048 8-bit Gaussian distributed random numbers stored in a look-up table 14 The look-up table 14 stores random numbers in 2's complement form in the range [−63, 63]. The list of Gaussian random numbers appears in the Appendix.

According to the bit-accurate specification of the present principles, generation of the film grain blocks begins with the lowest luminance intensity interval. The uniform random number generator 12 generates an index for the Gaussian random number list stored in the look-up table 14 using a primitive polynomial modulo 2 operator, $x^{18}+x^5+x^2+x^1+1$. For ease of understanding, the term $x(i, s)$ will indicate the $i^{th}$ symbol of the sequence x, beginning with an initial seed s. The random number seed becomes reset to 1 upon the receipt of each film grain SEI message.

To form an individual 8×8 film grain block, a random block generator 16 reads 8 lines worth of 8 random numbers from the Gaussian random number look-up table 14. A random offset, from the random number generator 12, serves to access each line of 8 random numbers. Each line of the block produced by the block generator 16 is generated as following:

index=$x(i, 1)$ for $n=0 \ldots 7, B[i \%8][n]=$
    Gaussian_list[(index+$n$)%2048]

where i increments for each 8×1 block line.

The 8×8 block of random values read by the generator 16 undergoes a transform, typically an integer Discrete Cosine Transform (DCT), performed by an Integer DCT transform block 18. After the DCT transform, the 8×8 random values undergo frequency filtering at a frequency filter 20 in accordance with the cut frequencies specified in the SEI message. Following frequency filtering, the 8×8 random values undergo an inverse DCT transform by an inverse integer DCT block 22. A first scaling block 24 scales the pixels on the top and bottom block lines as follows:

for $n=0..7$, $B'[0][n]=(B[0][n]+1)>>1$ for $n=0..7$, $B'[7][n]=(B[7][n]+1)>>1$

This process continues until generation of a set of 128 film grain blocks for each luminance intensity interval. Following subsequent scaling by the second scaling block 26, the film grain blocks undergo storage in the film grain pool 28.

Block and Pixel Operations to Simulate Film Grain

FIG. 2 illustrates an apparatus 200 in accordance with an illustrative embodiment of the present principles for simulating film grain on a pixel-by-pixel basis using the stored values in the film grain pool 28. The apparatus 200 includes a processing block 202 for to creating an average of each 8×8 block of luma pixel values for comparison to the parameters intensity_interval_lower_bound[0][i] and intensity_interval_upper_bound[0][i] in the film grain SEI message to determine the correct luminance intensity interval for the current block.

A selector block 204 selects a $k^{th}$ film grain block from the pool 28, using the random number generated by the uniform random number generator 16 from the polynomial modulo 128 as the block index. Thus, the noise generator 16, which generates uniformly distributed random numbers using a polynomial for the initialization process described with respect to FIG. 1, finds application in the apparatus 200 of FIG. 2 to select film grain blocks, with the random number seed reset to 1 after the pool creation process. If the resulting block index is identical to the previous one, the last bit of the index undergoes toggling. Such operation can occur using a bit-wise comparison and an XOR operator (^) as follows:

previous_index=index index=$x(k, 1)$% 128 index ^=(index==previous_index)

Following block selection, a deblocking filter 206 deblocks the pixels on the right most column of the previously selected block and on the left most column of the current block. An adder 208 adds the deblocked film grain block to decoded luma pixels. (Since two horizontally adjacent blocks are required to perform deblocking, there is a 1-block delay between the block selected in 204 and the block added in 208.) A clipper 210 clips the result within the range [0, 255] for display. Note that film grain noise addition only occurs to luma pixels.

Scaling of Cut Frequencies

The parameters in the film grain SEI message of TABLE 1 assume the use of a 16×16 DCT in the simulation process. In particular, horizontal and vertical high cut frequencies, provided by comp_model_value[0][i][1] and comp_model_value[0][i][2], and horizontal and vertical low cut frequencies, provided by comp_model_value[0][i][3] and comp_model_value[0][i][4], serve to filter the transform coefficients of a block of 16×16 values.

In the illustrated embodiment, the use of 8×8 blocks will reduce complexity. Employing an 8×8 block transform using cut frequency parameters based on a 16×16 transform implies that all the cut frequencies require scaling before the grain generation.

The scaling of the cut frequencies occurs as follows:

comp_model_value'[0][i][j]=
(comp_model_value [0][i][j]+1)>>1 where j is in the range [1,4]. Note that the scaling constitutes the equivalent of the integer division, rounded up to the nearest integer.

Integer Transform and Variance Scaling

The transform used for the frequency filtering corresponds to an 8×8 integer approximation to the DCT, using the following transformation matrix:

$$T_8 = \begin{pmatrix} 6 & 6 & 6 & 6 & 6 & 6 & 6 & 6 \\ 8 & 7 & 4 & 2 & -2 & -4 & -7 & -8 \\ 7 & 3 & -3 & -7 & -7 & -3 & 3 & 7 \\ 7 & -2 & -8 & -4 & 4 & 8 & 2 & -7 \\ 6 & -6 & -6 & 6 & 6 & -6 & -6 & 6 \\ 4 & -8 & 2 & 7 & -7 & -2 & 8 & -4 \\ 3 & -7 & 7 & -3 & -3 & 7 & -7 & 3 \\ 2 & -4 & 7 & -8 & 8 & -7 & 4 & -2 \end{pmatrix}$$

16-bit arithmetic can be used. The forward integer transformation of a given block of random noise is defined as:

$\tilde{B}=(((T_8 \times B+8)>>4) \times T_8^T+8)>>4$ with 11 bits used for $\tilde{B}$.
The inverse integer transform is defined as:

$B=(T_8^T \times \tilde{B} \times T_8+128)>>8$ with 8 bits used for B.

Following the inverse transform, the block B undergoes scaling as follows, assuming it is in the $k^{th}$ luminance intensity interval, val=$B(i, j)$*comp_model_value[0][k][0]

$B'(i, j)=(((\text{val}-(\text{val}>>4))+2^{log\,2-scale\_factor-1})>> log\,2\_scale\_factor)+16)>>5$ where the operation (val−(val>>4)) compensates the scaling of the integer transform; log 2_scale_factor, transmitted in the SEI message, scales comp_model_value[0][k][0]; and 5 scales the Gaussian numbers provided in the Appendix.

Deblocking Filter 206

As indicated, the film grain simulation apparatus of FIG. 2 includes a deblocking r smoothing blocking artifacts resulting from the small size of the transform. In the illustrated embodiment, the deblocking filter 206 takes the form of a 3-tap filter applied to all pixels bordering the 8×8 block left and right edges. Given a row of pixels belonging to two adjacent 8×8 blocks, the transition between blocks being located between pixels b and c,

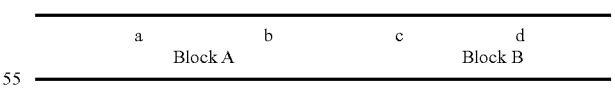

application of the deblocking occurs as follows:

$b'=(a+(b<<1)+c)>>2$ $c'=(b+(c<<1)+d)>>2$ where b' and c' replace the value of the original pixels b and c, respectively. Deblocking of the left and right block edges occurs for every film grain block before addition to the decoded image.

The foregoing describes a technique for simulating film grain in an image.

Appendix

The list of the 2048 Gaussian distributed random numbers are:

```
char Gaussian[2048]={
0xFB, 0x05, 0x33, 0xFB, 0x14, 0xEF, 0x06, 0x1D, 0x26,
0x30, 0xD5, 0x01, 0x20, 0xD9, 0x16, 0x1B, 0xE7, 0x0A,
0x06, 0xFB, 0xF6, 0xF7, 0x10, 0xC1, 0x08, 0xFE, 0xCC,
0x09, 0x09, 0x23, 0x17, 0xFB, 0xED, 0x15, 0xFF, 0x25,
0xDF, 0x1A, 0xD3, 0x10, 0xE9, 0x0A, 0xFF, 0xE5, 0x18,
0x00, 0xE4, 0xEC, 0x00, 0x3C, 0xC1, 0xCB, 0xE8, 0x04,
0x07, 0x3F, 0x3D, 0x36, 0x19, 0x3F, 0x00, 0x03, 0x38,
0x09, 0x0E, 0x06, 0x26, 0x38, 0x28, 0x2, 0xC1, 0x37,
0xE7, 0xF2, 0x01, 0xE8, 0xF5, 0x1D, 0xF2, 0xDC, 0x05,
0x38, 0x21, 0x27, 0xFF, 0xC7, 0xD5, 0xFE, 0xFE, 0x14,
0x1D, 0xD8, 0x18, 0xF3, 0xF1, 0xEF, 0xCC, 0x19, 0x08,
0xF4, 0xEF, 0xFA, 0xF9, 0xC1, 0xE5, 0xF5, 0xE5, 0xC1,
0xC8, 0x02, 0xF4, 0xDC, 0x3F, 0x3F, 0xFF, 0x14, 0x2B,
0xE0, 0xF9, 0x1B, 0x09, 0x2D, 0xD8, 0xE0, 0xE0, 0x11,
0xFD, 0xE5, 0x31, 0xFD, 0x2C, 0x3E, 0xF3, 0x2D, 0x00,
0x1F, 0x1D, 0xF9, 0xF5, 0x38, 0xF0, 0x3A, 0x06, 0x0C,
0x19, 0xF8, 0x35, 0xFD, 0x1A, 0x13, 0xEF, 0x08, 0xFD,
0x02, 0xD3, 0x03, 0x1F, 0x1F, 0xF9, 0x13, 0xEE, 0x09,
0x1B, 0x08, 0xE7, 0x13, 0x0, 0xEE, 0x3E, 0xED, 0xC5,
0x08, 0xF1, 0x00, 0x09, 0x31, 0x1E, 0x32, 0xFA, 0xDC,
0xF8, 0xE7, 0x31, 0x01, 0x01, 0x1D, 0x10, 0xFF, 0xFF,
0x04, 0xEC, 0xCC, 0xEE, 0x06, 0x3F, 0x07, 0xC1, 0xF1,
0xD5, 0xED, 0xE5, 0x16, 0xEC, 0x25, 0x0B, 0xF7, 0xF5,
0xDD, 0x25, 0xE6, 0x00, 0x10, 0xEA, 0x08, 0xD2, 0x1D,
0xE0, 0xDF, 0x1B, 0xCE, 0xF2, 0xD5, 0xEF, 0xD2, 0x21,
0x02, 0xDC, 0xE2, 0x2E, 0xEB, 0x06, 0xF4; 0xEE, 0xC1,
0xF8, 0x07, 0xC1, 0x1F, 0x11, 0x0F, 0x2E, 0x08, 0xE7,
0xE3, 0x23, 0x26, 0x28, 0x3F, 0x3F, 0x1E, 0x10, 0xCC,
0xD2, 0x00, 0x00, 0x25, 0xDE, 0x23, 0x3F, 0xF7, 0xC9,
0x0E, 0x0B, 0x07, 0x01, 0x13, 0x2D, 0x02, 0x14, 0x00,
0xFE, 0x13, 0x07, 0x38, 0xF2, 0xEE, 0x19, 0x15, 0x35,
0x0D, 0x3B, 0x03, 0xD9, 0x0C, 0xDE, 0xF6, 0x2E, 0xFB,
0x00, 0x09, 0x14, 0xE7, 0x27, 0xC1, 0xEB, 0x3F, 0x08,
0x05, 0xF6, 0x0F, 0xE7, 0x0D, 0xD4, 0xD3, 0xED, 0xF7,
0xFC, 0x0C, 0xC6, 0x23, 0xF4, 0xEB, 0x00, 0x05, 0x2A,
0xCB, 0x13, 0xF0, 0xC1, 0x17, 0x19, 0x4, 0xF6, 0x16,
0x00, 0x07, 0xEF, 0xDE, 0x00, 0xDC, 0x0C, 0xFD, 0x00,
0x0E, 0xFF, 0x16, 0x10, 0xF0, 0x3A, 0xEA, 0x27, 0xF5,
0xF8, 0xCA, 0xFB, 0xDD, 0x2C, 0xE9, 0x0B, 0xD3,
0x3B, 0xEE, 0x18, 0xC1, 0x1D, 0x10, 0xD8, 0xFB, 0xF8,
0xFD, 0x16, 0xC1, 0xF9, 0x2C, 0xc3, 0x08, 0x31, 0xED,
0xF0, 0x12, 0x15, 0xED, 0xF1, 0xF6, 0x34, 0xF7, 0x09,
0x09, 0xE3, 0xFC, 0x0F, 0x00, 0xC1, 0x10, 0x3F, 0xD6,
0x25, 0x0B, 0xEC, 0xE8, 0xC1, 0xCB, 0xF9, 0x16, 0xDB,
0x00, 0x0E, 0xF7, 0x14, 0xDE, 0xED, 0x06, 0x3F, 0xFF,
0x02, 0x0A, 0xDC, 0xE3, 0xC1, 0xFF, 0xFF, 0xE6, 0xFE,
0xC5, 0x2E, 0x3B, 0xD8, 0xE8, 0x00, 0x09, 0xEA, 0x21,
0x26, 0xFA, 0xF6, 0xC1, 0x11, 0xEC, 0x1B, 0x3B, xHE,
0xC7, 0xF5, 0x22, 0xF9, 0xD3, 0x0C, 0xD7, 0xEB, 0xC1,
0x35, 0xF4, 0xEE, 0x13, 0xFD, 0xFD, 0xD7, 0x02, 0xD5,
0x1S, 0xEF, 0x04, 0xC1, 0x13, 0x22, 0x18, 0xE1, 0x24,
0xE8, 0x36, 0xF3, 0xD4, 0xE9, 0xED, 0x16, 0x18, 0xFF,
0x1D, 0xEC, 0x28, 0x04, 0xC1, 0xFC, 0xE4, 0xE8, 0x3E,
0xE0, 0x17, 0x11, 0x3A, 0x07, 0xFB, 0xD0, 0x36, 0x2F,
0xF8, 0xE5, 0x22, 0x03, 0xFA, 0xFE, 0x18, 0x12, 0xEA,
0x3C, 0xF1, 0xDA, 0x14, 0xEA, 0x02, 0x01, 0x22, 0x08,
0xD9, 0x00, 0xD9, 0x02, 0x3F, 0x15, 0x0D, 0x3F, 0xC1,
0x0D, 0xE5, 0xF3, 0x1B, 0x37, 0x17, 0x35, 0x00, 0xDA,
0x00, 0x1A, 0xFC, 0xF5, 0xEB, 0x3D, 0x36, 0x3F, 0x32,
0x21, 0x17, 0x02, 0x00, 0x3D, 0xFA, 0xE5, 0xF0, 0xE8,
0x2C, 0x20, 0xCC, 0xFE, 0x2F, 0xE6, 0x1F, 0x16, x0E,
0x17, 0x09, 0xEF, 0x07, 0x14, 0x17, 0xD0, 0xF4, 0x2F,
0xDB, 0x3F, 0xC7, 0x3F, 0xDF, 0x00, 0xF8, 0x19, 0xD1,
0x17, 0x05, 0x11, 0xEA, 0xDB, 0x2C, 0xCB, 0xFC,
0xE4, 0xF2, 0xCA, 0xF4, 0x3F, 0xE2, 0xFA, 0x26, 0xEA,
0x08, 0x09, 0x29, 0xF5, 0x04, 0x3F, 0xDF, 0x1A, 0x01,
0x0C, 0x06, 0x37, 0x15, 0xC8, 0xF5, 0x05, 0xF4, 0x29,
0x21, 0xFA, 0x25, 0xC3, 0x1D, 0x3F, 0xFB, 0x31, 0xF7,
0x1F, 0xED, 0x1A, 0x04, 0x03, 0x1E, 0xE5, 0x01, 0xE4,
0x38, 0xCC, 0xE3, 0x01, 0xFC, 0xE9, 0x24, 0x2A, 0xE5,
0xEF, 0x06, 0x3B, 0x0D, 0x2E, 0xDD, 0x06, 0xCF,
0xDD, 0xF6, 0x0E, 0x23, 0xD1, 0x09, 0xE6, 0x20, 0xFA,
0xE1, 0xF4, 0x20, 0x24, 0xFC, 0x3F, 0x00, 0xC1, 0x33,
0xF6, 0xDC, 0xC9, 0xCD, 0xFD, 0x0E, 0xEC, 0xF6,
0xE3, 0xF2, 0xF4, 0x09, 0xFE, 0xE7, 0x2F, 0xE3, 0xD1,
0xEE, 0x11, 0x09, 0xDE, 0x3F, 0xF7, 0xC1, 0xF5, 0xC5,
0xE6, 0x12, 0x25, 0xC1, 0x00, 0xFB, 0xC5, 0xE6, 0xF3,
0x13, 0x22, 0x08, 0x08, 0xC7, 0x2C, 0x1F, 0x0C, 0x12,
0xF5, 0x18, 0xCE, 0xF1, 0xFC, 0xD1, 0xE6, 0x02, 0x2E,
0xF5, 0xE8, 0xFC, 0x19, 0x01, 0xDB, 0xD4, 0xFB,
0xED, 0x3F, 0xD5, 0xF5, 0x09, 0x0A, 0x38, 0x25, 0x19,
0xF1, 0x2E, 0xE1, 0x03, 0xFB, 0x17, 0x12, 0x32, 0xEB,
0xF8, 0xE6, 0xPD, 0xEE, 0xDA, 0xF1, 0xF6, 0x1F, 0x0F,
0x1F, 0x0A, 0xC1, 0x0F, 0x1F, 0x12, 0x33,9xD6, 0xFC,
0x26, 0x27, 0x1D, 0xD9, 0xFD, 0x11, 0x04, 0x28, 0xF4,
0xFC, 0x01, 0xF8, 0x23, 0x3F, 0x29, 0xD5, 0x1B, 0x09,
0xC5, 0xC3, 0x12, 0x05, 0x3F, 0x1C, 0xE5, 0x38, 0x06,
0x0C, 0x10, 0xFA, 0xE9, 0x0A, 0xFA, 0x02, 0x1C, 0x0D,
0x0C, 0x0C, 0xFB, 0xEE, 0x12, 0xD2, 0x26, 0x28, 0x04,
0x19, 0x06, 0x2, 0xFA, 0x00, 0x10, 0x16, 0xDB, 0x10,
0xED, 0xF5, 0xE8, 0xC1, 0xF3, 0x0F, 0xFC, 0x1, 0x06,
0x23, 0x06, 0x1C, 0x05, 0xE6, 0xD6, 0x1A, 0xEA, 0xEF,
0x00, 0x3F, 0x05, 0xDF, 0xEA, 0x17, 0xC7, 0x01, 0x05,
0x1C, 0xEF, 0x3B, 0xF7, 0xE2, 0x1A, 0xE3, 0xC1, 0xE8,
0xF5, 0x01, 0xFE, 0x08, 0xD8, 0xFE, 0x3F, 0x0C, 0x27,
0x21, 0x1F, 0xF4, 0x06, 0xE0, 0xEE, 0xC1, 0xF2, 0x0A,
0xE1, 0x20, 0xE6, 0xEC, 0x36, 0xE1, 0x07, 0xF6, 0x06,
0x0E, 0xE1, 0x0A, 0x0D, 0x2F, 0xEA, 0xE3, 0xC6, 0xFC,
0x27, 0xE8, 0x0B, 0xEB, 0xF8, 0x17, 0xE9, 0xC4, 0xEF,
0xF2, 0xE6, 0xEA, 0x0E, 0x3F, 0xFA, 0x18, 0xFC, 0xC1,
0x25, 0xF3, 0xF5, 0x2C, 0x1D, 0x05, 0xD1, 0x28, 0xE3,
0x1D, 0x1E, 0xF4, 0x14, 0xD3, 0xFF, 0xF6, 0xE3, 0xEA,
0xE3, 0xF5, 0xE6, 0x23, 0xF2, 0x21, 0xF1, 0xF5, 0x07,
0xF8, 0xDF, 0xF4, 0xF2, 0xE2, 0x17, 0x12, 0x08, 0x07,
0xEE, 0xF5, 0xFB, 0x04, 0xF3, 0xF7, 0x1D, 0x16, 0xE8,
0xE9, xFF, 0xF6, 0xD8, 0x0E, 0xDF, 0xC1, 0x25, 0x32,
0x02, 0xF8, 0x30, 0x11, 0xE0, 0x14, 0xE7, 0x03, 0xE3,
0x0B, 0xE4, 0xF7, 0xF4, 0xC5, 0xDC, 0x2D, 0x07, 0xF9,
0x27, 0xF0, 0xD9, 0xC1, 0xEF, 0x14, 0x26, 0xD7, 0x00,
0x1B, 0x0B, 0xDB, 0x3F, 0xF8, 0xF6, 0x06, 0x0F, 0x1B,
0xC8, 0xC1, 0x2C, 0x1B, 0x1E, 0x06, 0x1B, 0xFA, 0xC8,
0xF9, 0x0F, 0x18, 0xDF, 0xF8, 0x2D, 0xFC, 0x00, 0x0A,
0x22, 0xDD, 0x31, 0xF7, 0xC8, 0x20, 0xD3, 0xFC, 0xFC,
0xDD, 0x3F, 0x19, 0xD8, 0xE8, 0x0C, 0x1E, 0xE2, 0xC9,
0x03, 0xEC, 0x3F, 0x2B, 0xE0, 0x35, 0xC1, 0xFE, 0x11,
0xF9, 0x14, 0xE8, 0x06, 0x06, 0x24, 0xCE, 0xF3, 0x26,
0x3F, 0xFD, 0xCE, 0x2C, 0x12, 0x3C, 0x2C, 0xC2, 0xE3,
0x06, 0xD2, 0xC7, 0x0A, 0xDF, 0xD5, 0xD1, 0xC5, 0x15,
0xF2, 0xF1, 0x08, 0x02, 0xE6, 0xE2, 0x0A, 0xEB, 0x05,
0xDA, 0xE3, 0x06, 0x0E, 0x01, 0x03, 0xDC, 0x13, 0xE3,
0xFB, 0x36, 0xE6, 0x14, 0x21, 0xFA, 0xC1, 0xC1, 0xE8,
0x0B, 0x0E, 0x17, 0x11, 0x2D, 0x11, 0xF0, 0x39, 0xE7,
0xF, 0xE7, 0x2D, 0x03, 0xD7, 0x24, 0xF4, 0xCD, 0x0C,
0xFB, 0x26, 0x2A, 0x02, 0x21, 0xD8, 0xFA, 0xF8, 0xF0,
0xE8, 0x09, 0x19, 0x0C, 0x04, 0x1F, 0xCD, 0xFA, 0x12,
```

0x3F, 0x38, 0x30, 0x11, 0x00, 0xF0, 0xE5, 0x3F, 0xC3, 0xF0, 0x1E, 0xFD, 0x3B, 0xF0, 0xC1, 0xE6, 0xEB, 0x1F, 0x01, 0xFE, 0xF4, 0x23, 0xE4, 0xF0, 0xEB, 0xEB, 0x10, 0xE4, 0xC1, 0x3F, 0x0C, 0xEF, 0xFB, 0x08, 0xD8, 0x0E, 0xA4, 0x14, 0xC1, 0xC1, 0x0A, 0xE9, 0xFB, 0xEF, 0xE1, 0xE7, 0xF0, 0xD8, 0x27, 0xDA, 0xDC, 0x04, 0x0D, 0xDC, 0xFC, 0xDB, 0xD6, 0xD6, 0xE4, 0x0C, 0x27, 0xFC, 0xD0, 0x11, 0xE0, 0x04, 0xE3, 0x07, 0x00, 0xEC, 0x0, 0xD5, 0xEA, 0x08, 0xFF, 0xFC, 0x1D, 0x13, 0x0s, 0xCA, 0xED, 0x0B, 0x10, 0x08, 0xF2, 0x01, 0x19, 0xCA, 0xFE, 0x32, 0x00, 0x20, 0x0B, 0x00, 0x3F, 0x1E, 0x16, 0x0C, 0xF1, 0x03, 0x04, 0xFD, 0xE8, 0x31, 0x08, 0x15, 0x00, 0xEC, 0x10, 0xED, 0xE6, 0x05, 0xCA, 0xF7, 0x1C, 0xC1, 0x22, 0x0D, 0x19, 0x2E, 0xE13, 0x1E, 0xE7, 0x16, 0xED, 0x06, 0x2A, 0x3C, 0x0D, 0x21, 0x16, 0xC9, 0xD7, 0xFF, 0x0F, 0x12, 0x09, 0xEE, 0x1D, 0x23, 0x13, 0xDA, 0xE9, 0x1D, 0xD9, 0x03, 0xE1, 0xEF, 0xFA, 0x1E, 0x14, 0xC1, 0x23, 0xFE, 0x0B, 0xE5, 0x19, 0xC1, 0x21, 0xFE, 0xEC, 0x0E, 0xE1, 0x1D, 0xFF, 0x00, 0xF7, 0xEA, 9xD2, 0xD8, 0xD0, 0xF9, 0xE6, 0xFB, 0xFB, 0xDA, 0x06, 0x00, 0x03, 0xDF, 0xC1, 0x3F, 0xF3, 0x0D, 0xFA, 0x08, 0xFA, 0xF3, 0x00, 0x04, 0xE9, 0xF0, 0xF9, 0x0D, 0xF1, 0xE3, 0x1D, 0x26, 0xC4, 0x0D, 0x13, 0xE5, 0xE1, 0xF1, 0xF6, 0xEE, 0xF1, 0xED, 0xC1, 0xF4, 0xE2, 0x23, 0xC1, 0x38, 0xC1, 0x3F, 0x2B, 0xFD, 0x39, 0x36, 0x1A, 0x2B, 0xC1, 0x01, 0x07, 0x0B, 0x25, 0xCC, 0xE7, 0x61, 0x24, 0xD8, 0xC9, 0xDB, 0x20, 0x28, 0x0C, 0x1A, 0x3F, 0xEA, 0xE7, 0xCD, 0xEC, 0xE0, 0xF2, 0x27, 0xDF, 0x20, 0xF0, 0xF1, 0xFD, 0x3F, 0x00, 0xFA, 0xE7, 0x21, 0xF9, 0x02, 0xD2, 0x0E, 0xEF, 0xFD, 0xD3, 0xE4, 0xFF, 0x12, 0x15, 0x16, 0xF1, 0xDE, 0xFD, 0x12, 0x13, 0xE7, 0x15, 0xD8, 0x1D, 0x02, 0x3F, 0x06, 0x1C, 0x21, 0x16, 0x1D, 0xEB, 0xEB, 0x14, 0xF9, 0xC5, 0x0C, 0x01, 0xFB, 0x09, 0xFA, 0x19, 0x0E, 0x01, 0x1B, 0xE8, 0xFB, 0x00, 0x01, 0x30, 0xF7, 0x0E, 0x14, 0x06, 0x15, 0x27, 0xEA, 0x1B, 0xCB, 0xEB, 0xF7, 0x3F, 0x0, 0xFB, 0xF7, 0xD8, 0x29, 0xEE, 0x26, 0xCA, 0x07, 0x20, 0xE8, 0x15, 0x05, 0x06, 0x0D, 0x0D; 0x1E, 0x1C, 0x0F, 0x0D, 0x35, 0xF7, 0x1B, 0x06, 0x30, 0x02, 0xFD, 0xE2, 0xCD, 0x2F, 0x35, 0xEB, 0x1A, 0x0D, 0xE9, 0xFC, 0x34, 0xE6, 0x17, 0x2C, 0x33, 0xF0, 0x13, 0xEF, 0x1B, 0x19, 0x23, 0xD1, 0xEF, 0xD5, 0xCB, 0xF7, 0xF1, 0x04, 0xF7, 0x27, 0xF9, 0x26, 0x02, 0x0x, 0xCB, 0x2A, 0x0A, 0xEA, 0xED, 0xEC, 0x04, 0xF2, 0x25, 0x17, 0xDB, 0x1E, 0xC1, 0x3C, 0xC9, 0xE4, 0xF1, 0x14, 0x03, 0x27, 0x25, 0x21, 0x1C, 0x4, 0xF4, 0x0F, 0x1Z, 0xE9, 0xEE, 0x15, 0xDC, 0xEE, 0x1F, 0x3F, 0xDE, 0xE7, 0x2C, 0xF0, 0xE2, 0x1D, 0xE5, 0x15, 0x07, 0x02, 0xDF, 0x06, 0xD3, 0x1F, 0x0E, 0xED, 0xFF, 0x29, 0xFF, 0xED, 0xD6, 0xD6, 0x1C, 0x11, 0xDE, 0xE2, 0x0E, 0xEE, 0xD1, 0xD9, 0x02, 0x0F, 0xFE, 0xF0, 0xD9, 0xF6, 0xFC, 0xDA, 0x16; 0x03, 0xD2, 0xDD, 0x20, 0x04, 0xE8, 0x3F, 0xDE, 0x0C, 0xFB, 0xED, 0xC7, 0x1F, 0xC1, 0xCE, 0x02, 0xF1, 0x37, 0x0B, 0xE3, 0x20, 0xCE, 0x0D, 0xEB, 0x0A, 0xE3, 0xF3, 0xDC, 0x01, 0xD2, 0x02, 0x3F, 0x02, 0x25, 0xD5, 0xFC, 0xEB, 0xCE, 0x3F, 0x00, 0x3E, 0x2D, 0xE1, 0x19, 0x1C, 0x01, 0x28, 0xC1, 0x3F, 0x27, 0x3F, 0xF2, 0x0E, 0x3A, 0xDB, 0xF8, 0xE4, 0x34, 0x18, 0x16, 0x0C, 0xDD, 0x18, 0xED, 0xCB, 0x0F, 0xF0, 0x01, 0xFB, 0x14, 0xC1, 0x19, 0xCC, 0xEB, 0xEE, 0x19, 0x00, 0x17, 0x2B, 0xFC, 0x26, 0x0D, 0xEC, 0xF4, 0x2D, 0x2B, 0xES, 0x25, 0x05, 0x10, 0x26, 0x1D, 0x3F, 0x3F, 0xFD, 0xDC, 0x18, 0xF0, 0xCB, 0xEF, 0x12, 0x1C, 0x1A, 0xF8, 0xFE, 0x29, 0x1A, 0xCB, 0x1A, 0xC2, 0x0E, 0x0B, 0x1B, 0xEB, 0xD5, 0xF8, 0xFD, 0x17, 0x0B, 0xFC, 0x00, 0xFA, 0x37, 0x25, 0x0D, 0xE6, 0xEE, 0xF0, 0x13, 0x0F, 0x21, 0x13, 0x13, 0xE1, 0x12, 0x01, 0x0A, 0xF1, 0xE7, 0xF3, 0x1A, 0xED, 0xD5, 0x0A, 0x19, 0x39, 0x09, 0xD8, 0xDE, 0x00, 0xF9, 0xE9, 0xEA, 0xFF, 0x3E, 0x08, 0xFA, 0x0B, 0xD7, 0xD7, 0xDE, 0xF7, 0xE0, 0xC1, 0x04, 0x28, 0xE8, 0x1E, 0x03, 0xEE, 0xEA, 0xEB, 0x1C, 0xF3, 0x17, 0x09, 0xD6, 0x17, 0xFA, 0x14, 0xEE, 0xDB, 0xE2, 0x2A, 0xD9, 0xC1, 0x05, 0x19, 0x00, 0xFF, 0x06, 0x17, 0x02, 0x09, 0xD9, 0xE5, 0xF3, 0x20, 0xDD, 0x05, 0xCB, 0x09, 0xF8, 0x0S, 0xF1, 0x1F, 0xE5, 0x12, 0x25, 0xF8, 0x3F, 0xDC, 0xF0, 0xF2, 0xC5, 0x34, 0x21, 0x35, 0xCD, 0xCC, 0x23, 0x1E, 0x01, 0x0B, 0xFF, 0x10, 0xFE, 0xF9, 0xDF, 0xF9, 0xF5, 0xE5, 0x07, 0xE1, 0x25, 0x1C, 0xC9, 0x00, 0x29, 0xF3, 0x0A, 0x25, 0xED, 0xF8, 0xFB, 0x20, 0xF8, 0xC1, 0xE5, 0xE0, 0x0F, 0x2F, 0x3A, 0x01, 0xC8, 0xFD, 0xCA, 0xE1, 0x30, 00x04, 0x19, 0x03, 0x25, 0xF3, 0x24, 0x38, 0xEE, 0xC9, 0x2F, 0xE7, 0x0B, 0xFA, 0xF7, 0x1B, 0x0A, 0x0B, 0x2D, 0x2D, 0x0B, 0xE8, 0x08, 0xDB, 0x0B, 0x04, 0xE8, 0xD0, 0xEE, 0x18, 0xEF, 0x11, 0xC1, 0xD6, 0x15, 0x3F, 0xF5, 0xF4, 0x2A, 0x29, 0xEF, 0xF0, 0xFA, 0x36, 0x33, 0xED, 0x19, 0xDF, 0x11, 0x09, 0xF5, 0x18, 0xF1, 0x3F, 0x14, 0x0C, 0xD2, 0xFF, 0xFF, 0x34, 0x01, 0xE4, 0xF8, 0x03, 0x3F, 0xF8, 0x3E, 0x21, 0x22, 0xE2, 0x0F, 0xEF, 0x1A, 0xE4, 0xF5, 0x08, 0x15, 0xEF, 0x3, 0xE4, 0xDF, 0xF6, 0xFC, 0xE8, 0x21, 0x06, 0x20, 0x02, 0x17, 0x1B, 0x3F, 0xDB, 0x16, 0x2C, 0xE0, 0xFA, 0xDA, 0xD8, 0xD3, 0x0B, 0x0E, 0x10, 0xED, 0xD5, 0xF0, 0x30, 0xD3, 0x13, 0x04, 0xE1, 0xFF, 0xFB, 0x3F, 0xE8, 0xEE, 0xE5, 0x0B, 0xEF, 0xEF, 0xE6, 0x2C, 0xD3, 0x00, 0x18, 0x26, 0xFE, 0xC1, 0x08, 0x16, 0xFE, 0xDC, 0x00, 0xE4, 0xF7, 0xDC, 0x0E, 0x2E, 0x1D, 0x18, 0x0A, 0x08, 0x37, 0xC9, 0x10, 0xD7, 0x17, 0x17, 0xFB, 0x11, 0xD5, 0x15, 0x1C, 0xD0, 0x3F, 0xF8, 0x00, 0x00, 0xED, 0xC1, 0xFF, 0x00, 0x1F, 0x2E, 0x00, 0x12, 0xE0, 0xE2, 0xF7, 0x13, 0xC1, 0x1C, 0x18, 0xF8, 0x3F, 0x2C, 0xEB, 0xCA, 0xE7, 0xF8, 0x03, 0xEE, 0x22, 0x17, 0xF9, 0x35, 0x14, 0x1C, 0x03, 0x09, 0x03, 0x01, 0x2B, 0xD4, 0xD2, 0xF8, 0xF6, 0xF5, 0x06, 0x03, 0xFE, 0xDA, 0xD3, 0xFF, 0x03, 0xEF, 0xFE, 0x09, 0x01, 0xC9, 0x02, 0xDF, 0xD8, 0x3C, 0xF7, 0xF0, 0xEE, 0xD6, 0x3F, 0x21, 0x16, 0x08, 0x17 };

The invention claimed is:

1. In combination with a film grain generation apparatus, a method for simulating bit accurate film grain in an image block, comprising the steps of:
    computing, via the film grain generation apparatus, the average of the pixel values within the image block;
    randomly selecting, as a function of the average value of the image block, a block of bit accurate film grain from among a pool of previously established blocks of bit accurate film grain via the film grain generation apparatus.

2. The method according to claim 1 further including the step of blending, via the film grain generation apparatus, each pixel in the selected film grain block with a corresponding pixel in the image block.

3. The method according to claim 2 further comprising the step of populating the look-up table, via the film grain generation apparatus, in advance of film grain simulation with random numbers generated by a random number generator.

4. The method according to claim 1 wherein the step of randomly selecting a film grain block further includes the step of accessing a look up table containing random numbers to obtain a random number via the film grain generation apparatus.

5. Apparatus for simulating bit accurate film grain in an image block, comprising:
    means for computing the average of the pixel values within the block;
    means for randomly selecting, as a function of the average value of the image block, a block of bit accurate film grain from among a pool of previously established blocks of bit accurate film grain; and means for blending each pixel in the selected block of bit accurate film grain with a corresponding pixel in the image block.

6. The apparatus according to claim 5 wherein the means for randomly selecting a film grain block further comprises a look up table containing random numbers.

* * * * *